United States Patent
Tanaka et al.

(10) Patent No.: US 9,663,073 B2
(45) Date of Patent: May 30, 2017

(54) CLEANING APPARATUS FOR IN-VEHICLE OPTICAL SENSOR

(71) Applicant: DENSO CORPORATION, Kariya, Aichi-pref. (JP)

(72) Inventors: Hitoshi Tanaka, Chiryu (JP); Muneaki Matsumoto, Okazaki (JP)

(73) Assignee: DENSO CORPORATION, Kariya (JP)

(*) Notice: Subject to any disclaimer, the term of this patent is extended or adjusted under 35 U.S.C. 154(b) by 156 days.

(21) Appl. No.: 14/411,962

(22) PCT Filed: Jun. 20, 2013

(86) PCT No.: PCT/JP2013/003854
§ 371 (c)(1),
(2) Date: Dec. 30, 2014

(87) PCT Pub. No.: WO2014/017015
PCT Pub. Date: Jan. 30, 2014

(65) Prior Publication Data
US 2015/0183406 A1    Jul. 2, 2015

(30) Foreign Application Priority Data
Jul. 23, 2012  (JP) .................................. 2012-162923

(51) Int. Cl.
*B05B 7/08* (2006.01)
*B08B 3/02* (2006.01)
(Continued)

(52) U.S. Cl.
CPC .............. *B60S 1/56* (2013.01); *B05B 7/0815* (2013.01); *B08B 3/02* (2013.01); *B60R 1/00* (2013.01);
(Continued)

(58) Field of Classification Search
CPC . B05B 7/0815; B08B 3/02; B60R 1/00; B60S 1/46; B60S 1/54; B60S 1/56; B60S 1/60; G02B 27/0006
(Continued)

(56) References Cited

U.S. PATENT DOCUMENTS

2003/0155001 A1* 8/2003 Hoetzer ............... B60S 1/0822
                                                              134/37
2011/0073142 A1    3/2011 Hattori et al.
(Continued)

FOREIGN PATENT DOCUMENTS

JP    2000-236462 A    8/2000
JP    2001-171491 A    6/2001
(Continued)

OTHER PUBLICATIONS

International Search Report of the International Searching Authority mailed Jul. 30, 2013 for the corresponding International application No. PCT/JP2013/003854 (and English translation).
(Continued)

*Primary Examiner* — Michael Barr
*Assistant Examiner* — Levon J Shahinian
(74) *Attorney, Agent, or Firm* — Posz Law Group, PLC

(57) ABSTRACT

A cleaning apparatus for an in-vehicle optical sensor includes a cleaning liquid nozzle and an air nozzle. The cleaning liquid nozzle jets out a cleaning liquid toward a lens surface of a lens of the in-vehicle optical sensor or a translucent surface of a translucent cover covering the lens surface when the translucent cover exists. The air nozzle jets out air toward a used cleaning liquid, which was jetted out from the cleaning liquid nozzle and cleaned the lens surface or the translucent surface, to prevent the used cleaning liquid
(Continued)

from dropping from the lens surface or the translucent surface on a predetermined position by blowing away the used cleaning liquid.

13 Claims, 12 Drawing Sheets

(51) Int. Cl.
  *B60R 1/00* (2006.01)
  *B60S 1/46* (2006.01)
  *B60S 1/54* (2006.01)
  *B60S 1/56* (2006.01)
  *B60S 1/60* (2006.01)
  *G02B 27/00* (2006.01)

(52) U.S. Cl.
  CPC . *B60S 1/46* (2013.01); *B60S 1/54* (2013.01); *B60S 1/60* (2013.01); *G02B 27/0006* (2013.01)

(58) Field of Classification Search
  USPC .......... 15/250.001; 134/26, 34, 36, 37, 94.1, 134/95.1, 95.2, 95.3, 99.1, 100.1, 102.1, 134/102.2, 123, 198; 359/509
  See application file for complete search history.

(56) References Cited

U.S. PATENT DOCUMENTS

| 2011/0266375 | A1 | 11/2011 | Ono et al. |
| 2011/0292212 | A1 | 12/2011 | Tanabe et al. |
| 2013/0092758 | A1 | 4/2013 | Tanaka et al. |

FOREIGN PATENT DOCUMENTS

| JP | 2009-67341 A | 4/2009 |
| JP | 2009-81765 A | 4/2009 |

OTHER PUBLICATIONS

Written Opinion of the International Searching Authority mailed Jul. 30, 2013 for the corresponding International application No. PCT/JP2013/003854 (and English translation).

* cited by examiner

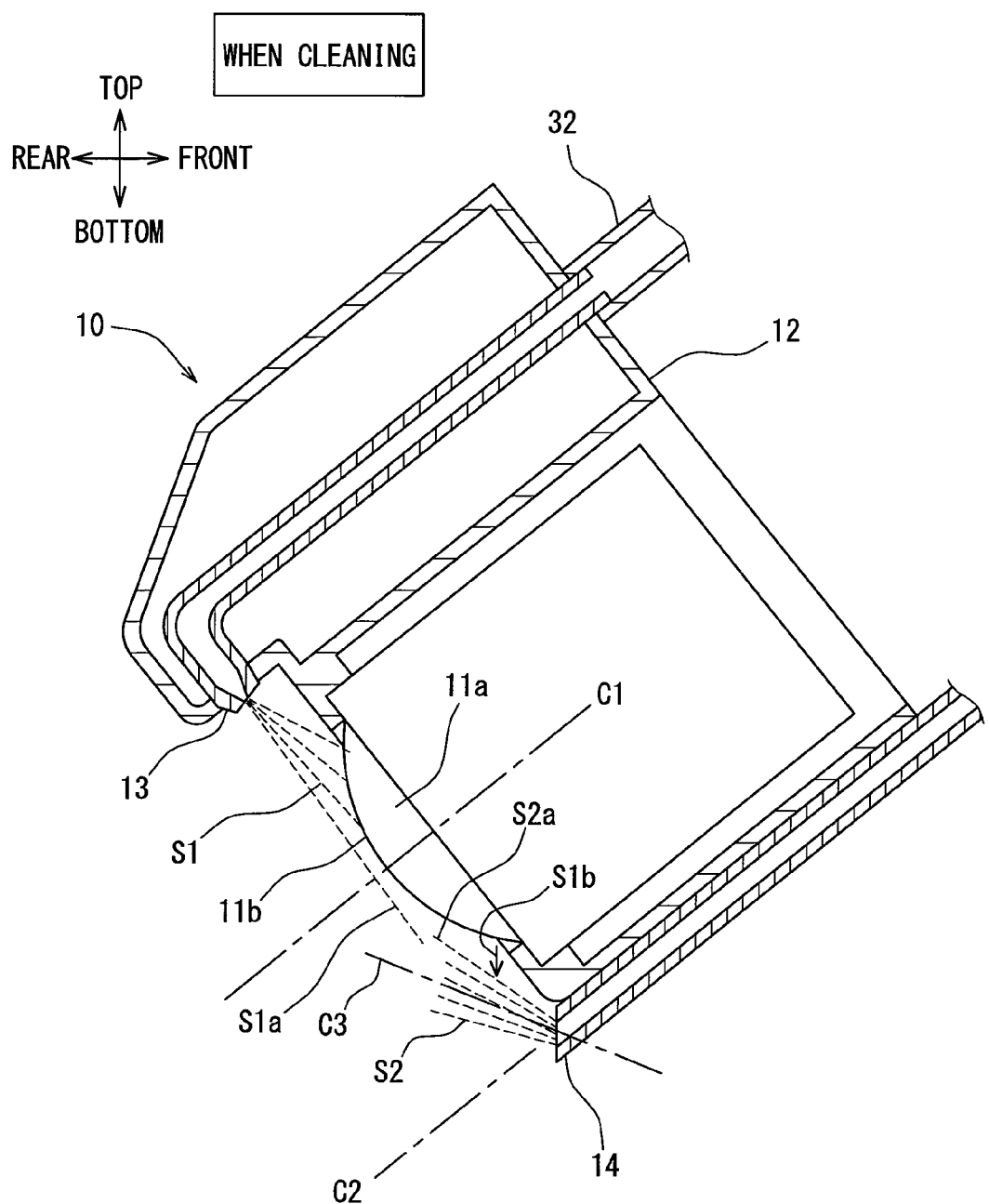

CLEANING APPARATUS FOR IN-VEHICLE OPTICAL SENSOR

CROSS REFERENCE TO RELATED APPLICATION

The present disclosure is a U.S. national stage application of PCT/JP2013/003854 filed on Jun. 20, 2013, and is based on Japanese Patent Application No. 2012-162923 filed on Jul. 23, 2012, the contents of which are incorporated herein by reference.

TECHNICAL FIELD

The present disclosure relates to a cleaning apparatus for cleaning a lens or a translucent cover of an in-vehicle optical sensor such as a camera or a proximity sensor.

BACKGROUND ART

The cleaning apparatus disclosed in, for example, patent literatures 1-5 have a cleaning liquid nozzle for jetting out a cleaning liquid toward a lens surface of a lens (or a translucent surface of a translucent cover). The jetted cleaning liquid removes extraneous matters, such as water and mud, adhered to the lens surface.

The patent literature 5 discloses blowing compressed air to a glass in front of a camera after blowing high-pressure water to it.

PRIOR ART LITERATURES

Patent Literature

Patent Literature 1: JP-A-2011-240910
Patent Literature 2: JP-A-2011-240912
Patent Literature 3: JP-A-2011-245989
Patent Literature 4: JP-A-2012-37548
Patent Literature 5: JP-A-2001-171491

SUMMARY OF INVENTION

However, it is unavoidable that a used cleaning liquid which cleaned the lens surface (or the translucent surface) will drip from the lens surface. The used cleaning liquid drips on and soils a vehicle body or parts mounted on the vehicle body.

In view of the above, it is an object of the present disclosure to provide an apparatus for cleaning an in-vehicle optical sensor in such a manner that a vehicle body and parts mounted on the vehicle body are less likely to be soiled with a used cleaning liquid.

Means for Solving Problem

According to an aspect of the present disclosure, a cleaning apparatus for an in-vehicle optical sensor includes a cleaning liquid nozzle and an air nozzle. The cleaning liquid nozzle jets out a cleaning liquid toward a lens surface of a lens of the in-vehicle optical sensor or a translucent surface of a translucent cover covering the lens surface when the translucent cover exists. The air nozzle jets out air toward the used cleaning liquid, which was jetted out from the cleaning liquid nozzle and cleaned the lens surface or the translucent surface, to prevent the used cleaning liquid from dropping from the lens surface or the translucent surface on a predetermined position by blowing away the used cleaning liquid.

Thus, since the used cleaning liquid dripping from the lens surface (or the translucent surface) is blown away by the air and does not drop on the predetermined position, a vehicle body and parts mounted on the vehicle body are less likely to be soiled with the used cleaning liquid.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram illustrating a jet pattern when a cleaning liquid and air are jetted out from a cleaning liquid nozzle according to the first embodiment;

EMBODIMENTS FOR CARRYING OUT INVENTION

Figure 1:
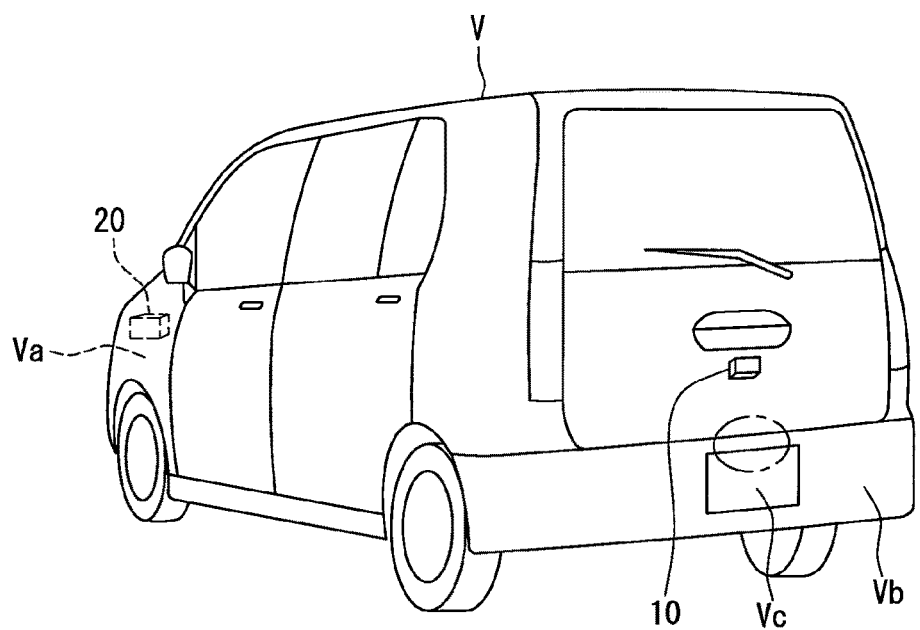
FIG. 1 is a diagram illustrating a mounting position of a camera to be cleaned in a vehicle according to a first embodiment of a present disclosure.

Embodiments of a cleaning apparatus for an in-vehicle optical sensor according to the present disclosure are described below with reference to the drawings. Throughout the embodiments, like characters of reference indicate the same or equivalent parts in the drawings. Arrows shown in the drawings and indicating top, bottom, front, and rear directions are directions when it is mounted on a vehicle.

First Embodiment

According to the present embodiment, a camera is taken as an example of an in-vehicle optical sensor to be cleaned, and a camera unit 10 having the camera is mounted at the rear of a vehicle V. An image of the area behind the vehicle captured by the camera unit 10 is shown on a display installed in the interior of the vehicle and used to assist a driver in backing up.

Figure 2:
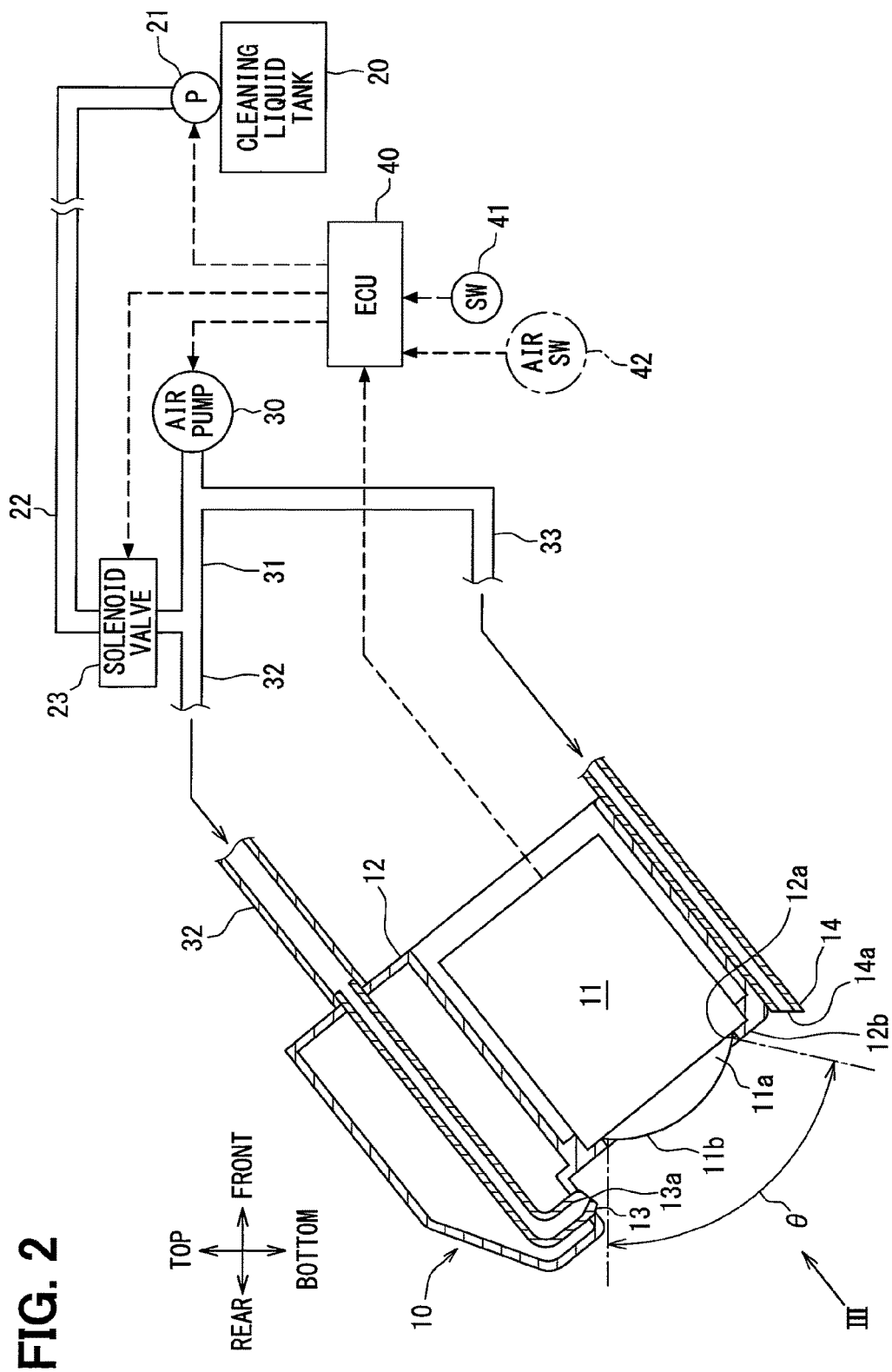
FIG. 2 is a diagram illustrating a cleaning apparatus for an in-vehicle optical sensor according to the first embodiment.

As shown in FIG. 2, the camera unit 10 includes a housing 12 and a camera 11 held in the housing 12. A lens 11a of the camera 11 is a convex lens and exposed outward from an opening 12a of the housing 12. A portion of the housing 12 forming the opening 12a serves as a lens holder 12b. This lens holder 12b is in contact with the lens 11a and forms a seal which prevents water from entering the housing 12 while fixing the lens surface 11b to a predetermined position.

The vehicle V is equipped with a cleaning apparatus (a cleaning apparatus for an in-vehicle optical sensor) which cleans a lens surface 11b of the camera 11. The lens surface 11b is a surface of an exposed portion of the lens 11a from the opening 12a.

Next, a structure of the cleaning apparatus is described. The cleaning apparatus mainly includes a cleaning liquid nozzle 13, an air nozzle 14, a cleaning liquid tank 20, an air pump 30, and an electronic control unit (ECU 40).

The cleaning liquid tank 20 is placed in an engine room Va located at the front of the vehicle V, and a cleaning liquid in the tank is also used to clean a front windshield. The cleaning liquid in the tank is pumped by a liquid pump 21 from the inside of the engine room Va to the camera unit 10, located at the rear of the vehicle V, through a pipe 22. The pumped cleaning liquid is jetted out from the cleaning liquid nozzle 13 of the housing 12 toward the lens surface 11b.

The air pump 30 is located outside the engine room Va and located near the camera unit 10. Air pumped from the air pump 30 is supplied to the cleaning liquid nozzle 13 through an air pipe 31. That is, the pipe 22 for the cleaning liquid and the air pipe 31 are connected to a merging pipe 32, and the merging pipe 32 is connected to the cleaning liquid nozzle 13. The merging pipe 32 supplies to the cleaning liquid nozzle 13 a mixture of the cleaning liquid supplied from the pipe 22 and the air supplied from the air pipe 31. Thus, the cleaning liquid and the air are jetted out from the cleaning liquid nozzle 13.

The pipe 22 is provided with a solenoid valve 23. When the solenoid value 23 is opened, both the cleaning liquid and the air are jetted out from the cleaning liquid nozzle 13, and when the solenoid value 23 is closed, only the air is jetted out from the cleaning liquid nozzle 13. Operations of the solenoid valve 23, the liquid pump 21, and the air pump 30 are controlled by the ECU 40. The ECU 40 generates image signals based on video signals outputted from the camera 11 and outputs the image signals to the display in the interior of the vehicle, thereby controlling a display content of the display.

The air pipe 31 is connected to a branch pipe 33, and the branch pipe 33 is connected to the air nozzle 14. Thus, the air pumped from the air pump 30 is also supplied to the air nozzle 14 through the branch pipe 33. That is, when the air pump 30 operates, the air is jetted out from both the cleaning liquid nozzle 13 and the air nozzle 14.

Figure 3A:
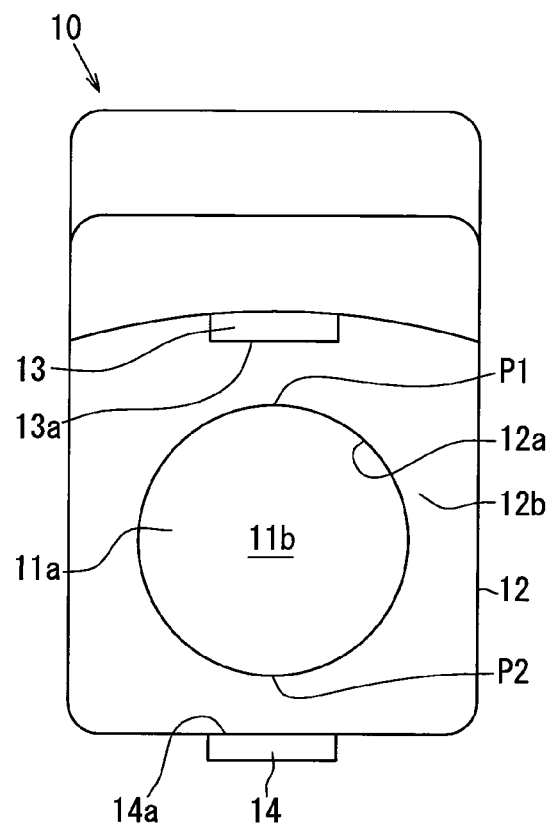
FIG. 3A is a diagram viewed from an arrow III in FIG. 2 and illustrating a no jet condition.

As shown in FIG. 3A, a jet hole 13a of the cleaning liquid nozzle 13 is located above an uppermost end P1 of the lens surface 11b. A jet hole 14a of the air nozzle 14 is located below a lowermost end P2 of the lens surface 11b. These jet holes 13a and 14a are located in the center of the lens 11a in a left-to-right direction.

In FIG. 2, a symbol θ represents an angle of view of the camera 11, and both the jet holes 13a and 14a are located outside the angle θ of view. Thus, the jet holes 13a and 14a are prevented from being caught in the video captured by the camera 11.

Figure 3B:
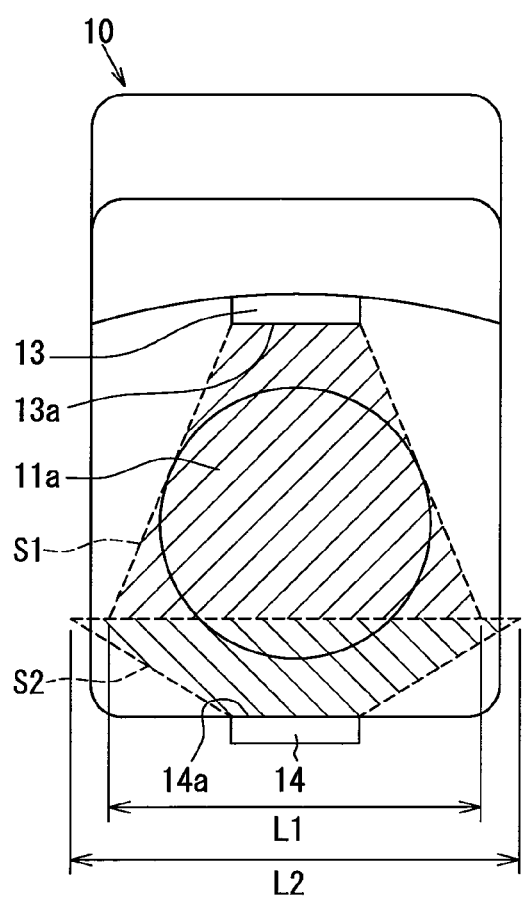
FIG. 3B is a diagram viewed from the arrow III in FIG. 2 and illustrating a jet condition.

In FIG. 3B, a diagonally shaded area indicated by a symbol S1 represents a jet pattern of the cleaning liquid jetted out from the cleaning liquid nozzle 13 together with the air, and a diagonally shaded area indicated by a symbol S2 represents a jet pattern of the air jetted out from the air nozzle 14 together with the air. A length of the jet pattern S1 and a length of the jet pattern S2 in the left-right direction at a position where the jet patterns S1 and S2 collide with each other are defined as L1 and L2, respectively. The shapes and positions of the jet holes 13a and 13b are set so that L2>L1.

FIG. 4 is a diagram illustrating a side view of the jet patterns S1 and S2. Most of the jet pattern S1 directly collides with the lens surface 11b. However, as indicated by a symbol S1a in FIG. 4, a portion of the jet pattern S1 passes behind the lens surface 11b without colliding with the lens surface 11b. The cleaning liquid collided with the lens surface 11b flows down the lens surface 11b to the lowermost end P2. Then, the cleaning liquid puddled at the lowermost end P2 drips from the lens surface 11b.

The jet pattern S2 collides with the cleaning liquid S1a passed behind the lens surface 11b, thereby blowing away the cleaning liquid S1a toward behind the vehicle.

In FIG. 4, a symbol C1 represents an optical axis of the lens 11a, a symbol C2 represents a reference line which is parallel to the optical axis C1 and passes through the jet hole 14a, and a symbol C3 represents a center line of the jet pattern S2. The shape and position of the jet hole 14a are set so that the center line C3 can extend toward a position higher than a position toward which the reference line C2 extends. However, it is set so that the air cannot be directly jetted on the lens surface 11b (refer to a symbol S2a). That is, the jet pattern S1 does not interfere with the jet pattern S2.

Figure 5:
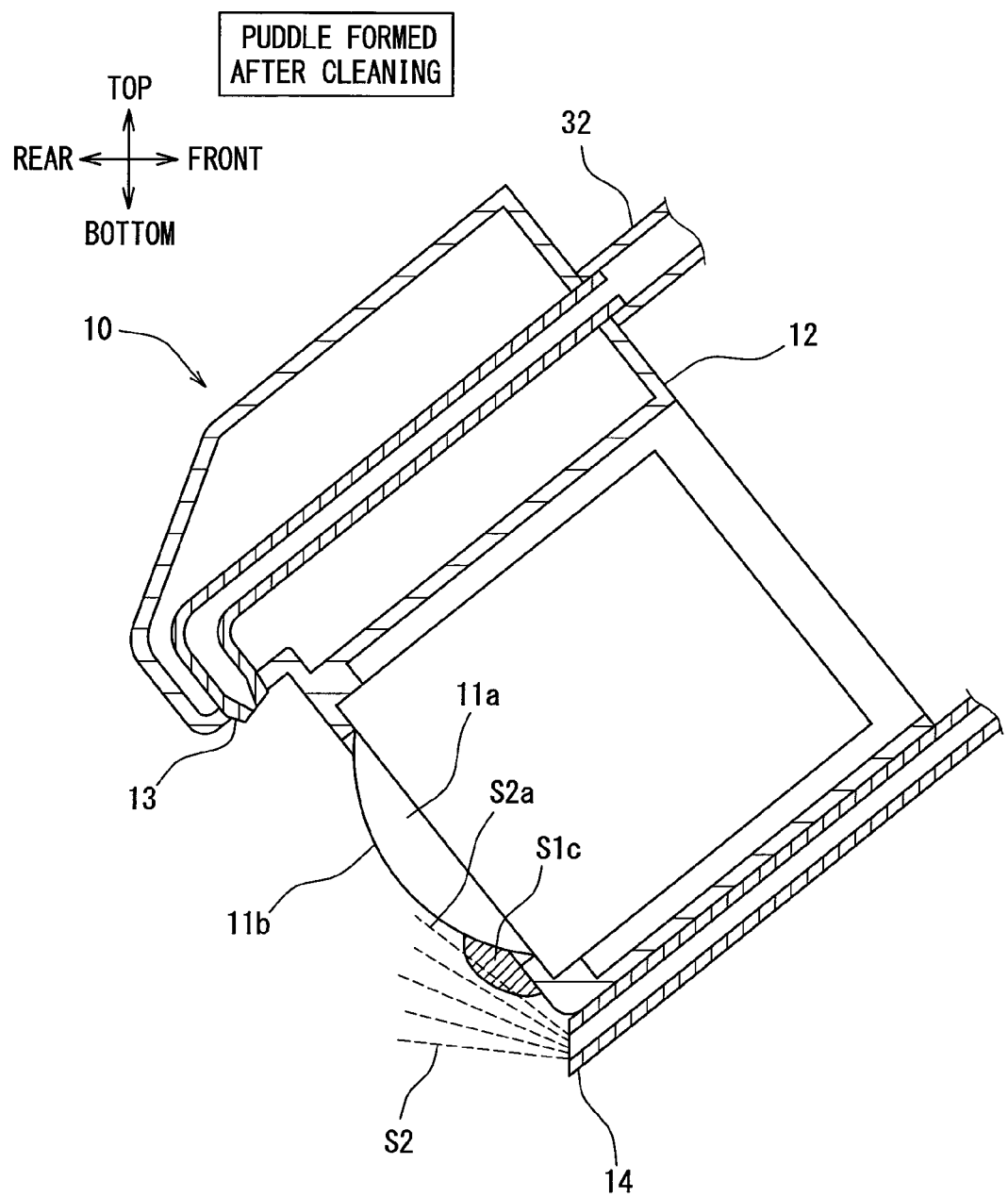
FIG. 5 is a diagram illustrating a situation where a puddle of the cleaning liquid is formed in a lens just after a jet of the cleaning liquid is stopped according to the first embodiment.

As shown in FIG. 5, the cleaning liquid adhered to the lens surface 11b flows down the lens surface 11b to the lowermost end P2 of the lens surface 11b just after the jet of the cleaning liquid from the cleaning liquid nozzle 13 is ended. Then, the cleaning liquid flowed down the lens surface 11b is puddled at the lowermost end P2 and at a portion of the lens holder 12b adjacent to the lowermost end P2 so that a liquid puddle S1c can be formed as indicated by diagonal lines in the drawing.

As mentioned previously, the shape and position of the jet hole 14a are set so that the air cannot be directly jetted on the lens surface 11b and further set so that the air can be directly jetted on the liquid puddle S1c (refer to the symbol S2a). Thus, the liquid puddle S1c is blown away by the air jetted out from the air nozzle 14. If the air jet from the air nozzle 14 is not performed, the liquid puddle S1c persists by surface tension at the lens holder 12b and the lowermost end P2.

The cleaning apparatus configured in the above manner starts operating when a switch 41 mounted in the interior of the vehicle is turned ON and stops operating when the switch 41 is turned OFF. Operation procedures of the cleaning apparatus are described below with reference to FIG. 6.

Figure 6:
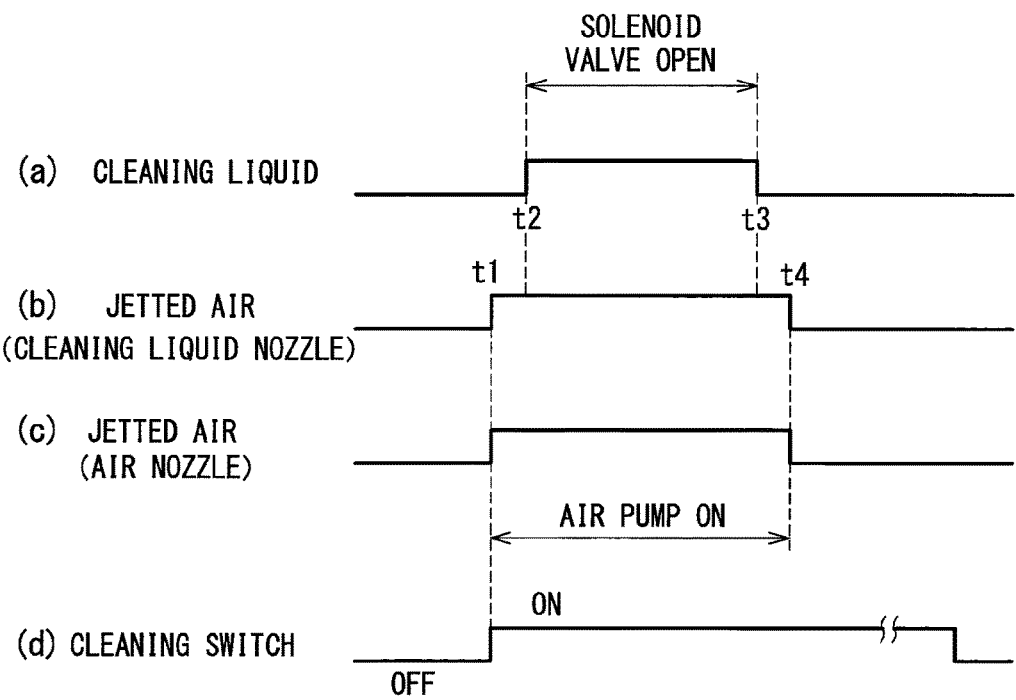
FIG. 6 is a timing diagram illustrating timings of jetting the cleaning liquid and the air.

When the switch 41 is turned ON at a time t1 in FIG. 6, the ECU 40 firstly actuates the air pump 30. At this time, the liquid pump 21 can be actuated while keeping the solenoid valve 23 open. Then, at a time t2, which arrives when a first predetermined time period elapses after the start time t1, the solenoid valve 23 is opened so that the cleaning liquid supplied from the liquid pump 21 can be supplied to the cleaning liquid nozzle 13. Then, at a time t3 which arrives when a second predetermined time period elapses after the open valve time t2, the solenoid valve 23 is closed so that the jet of the cleaning liquid from the cleaning liquid nozzle 13 can be stopped. Then, at a time t4, which arrives when a third predetermined time period elapses after the close valve time t3, the air pump 30 is stopped.

Therefore, when a user turns ON the switch 41, the air is jetted out from both the cleaning liquid nozzle 13 and the air nozzle 14. Then, the cleaning liquid is jetted out from the cleaning liquid nozzle 13 together with the air. Thus, extraneous matters adhered to the lens surface 11b are cleaned up and removed by the cleaning liquid mixed with the air. Then, the jet of the cleaning liquid from the cleaning liquid nozzle 13 is stopped while the jet of the air from both the nozzles 13 and 14 is continued. Then, the jet of the air is stopped by lagging behind the jet of the cleaning liquid.

It is noted that the above-mentioned first to third predetermined time periods are set as follows: the second predetermined time period>the third predetermined time period>the first predetermined time period As described above, according to the present embodiment, the cleaning liquid jetted out from the cleaning liquid nozzle 13 together with the air collide with the air jetted out from the air nozzle 14 and is blown away toward behind the vehicle. If the jet of the air from the air nozzle 14 is not performed, the cleaning liquid falls on a predetermined position (refer to a dashed-dotted line in FIG. 1) of the vehicle V, such as a bumper Vb and a license plate Vc of the vehicle V directly below the lens 11a, and soils the vehicle V. In contrast, as described above, according to the present embodiment, since the used cleaning liquid is blown away toward behind the vehicle, the vehicle V can be prevented from being soiled by the cleaning liquid.

Further, the present embodiment can provide the following effects.

(1) It is noted that when the cleaning liquid collided with the lens surface 11b flows down the lens surface 11b, the extraneous matters adhered to the lens surface 11b can be cleaned up effectively. However, in contrast to in the present embodiment, if the jet of the air from the air nozzle 14 is directly jetted on the lens surface 11b, the cleaning liquid flowing down the lens surface 11b is pushed back by the jet of the air. Therefore, the clean-up effect is reduced. Based on this study, according to the present embodiment, as indicated by the symbol S2a, the air nozzle 14 is arranged so that the air cannot be directly jetted on the lens surface 11b. In such an approach, the cleaning liquid is less likely to be pushed back so that the extraneous matters can be cleaned up effectively.

(2) It is noted that when the liquid puddle S1c is formed at the lowermost end P2 of the lens 11a after the jet of the cleaning liquid is ended, there is a possibility that the liquid puddle S1c can be located inside the angle θ of view of the camera 11. In this case, the liquid puddle S1c may be caught in the video captured by the camera 11 and degrade the video. Based on this study, according to the present embodiment, the jet hole 14a of the air nozzle 14 is located below the lowermost end P2 of the lens surface 11b. Thus, the liquid puddle S1c can be easily blown away by the jet of the air from the air nozzle 14.

(3) Further, according to the present embodiment, the air is not directly jetted on the lens surface 11b while being directly jetted on the liquid puddle S1c (refer to the symbol S2a in FIG. 5). Thus, it is possible to increase the certainty that the jet of the air from the air nozzle 14 can blow away the liquid puddle S1c.

(4) The jet hole 14a of the air nozzle 14 is located below the lowermost end P2 of the lens surface 11b. Thus, it is possible to increase the certainty that the entire cleaning liquid falling from the lens surface 11b can be blown away.

(5) Since the air is jetted out from the air nozzle 14 toward the position higher than the reference line C2, the cleaning liquid can be blown away as far as possible from the predetermined position Vb, Vc. Thus, it is possible to increase the certainty that the cleaning liquid can be prevented from dripping on the predetermined position Vb, Vc of the vehicle V.

(6) The cleaning liquid nozzle 13 is capable of jetting out the cleaning liquid together with the air pumped from the air pump 30. That is, the nozzles 13 and 14 share one air pump 30. Thus, since the supply of the air to the air nozzle 14 can be achieved simply by connecting the air pipe 31 to the branch pipe 33, a structure for supplying the air to the air nozzle 14 can be simplified.

(7) The period from the time t1 to the time t4 (refer to FIG. 6) during which the cleaning liquid nozzle 13 jets out the air is set equal to the period from the time t1 to the time t4 during which the air nozzle 14 jets out the air. Specifically, as shown in FIG. 2, it is configured so that the air pipe 31 for supplying the air to the cleaning liquid nozzle 13 always communicate with the branch pipe 33 for supplying the air to the air nozzle 14. Thus, as compared to when the jets of the air are controlled independently, the air pipe structure can be simplified.

(8) It is noted that even after the time t3 at which the solenoid valve 23 is closed so that the jet of the cleaning liquid can be ended, the cleaning liquid, which was jetted out from the cleaning liquid nozzle 13 at the time t3, exists in midair or on the lens surface 11b for a while. Based on this study, according to the present disclosure, the ECU 40 controls the jet states of the nozzles 13 and 14 so that the time t4 at which the jet of the air from the air nozzle 14 is ended can be later than the time t3 at which the jet of the cleaning liquid is ended. Thus, the cleaning liquid, which was jetted out from the cleaning liquid nozzle 13 at the time t3, can be entirely blown away by the air jetted out from the air nozzle 14.

However, the cleaning liquid nozzle 13 jets out the air for the same period of time as the air nozzle 14 jets out the air. Therefore, it can be entirely blown away while the air pipe structure is simplified.

(9) The ECU 40 controls the jet states of the nozzles 13 and 14 so that the time 1 which the jet of the air from the air nozzle 14 is started can be earlier than the time t2 at which the jet of the cleaning liquid is started. Thus, it is possible to increase the certainty that the jet of the air from the air nozzle 14 can blow away the entire cleaning liquid jetted out from the cleaning liquid nozzle 13. However, the cleaning liquid nozzle 13 jets out the air for the same period of time as the air nozzle 14 jets out the air. Therefore, as mentioned above, it can be entirely blown away while the air pipe structure is simplified.

(10) In consideration of a time period elapsed from when the jet of the cleaning liquid is ended to when no cleaning liquid dropping from the lens surface 11b remains, it is preferable that the jet end delay time of the air (the first predetermined time period) should be longer than the jet start delay time of the cleaning liquid (the second predetermined time period). Based on this study, according to the present embodiment, the third predetermined time period is set longer than the first predetermined time period. Thus, the air jet time period can be reduced to the minimum necessary while the entire cleaning liquid is blown away.

Second Embodiment

Figure 7:
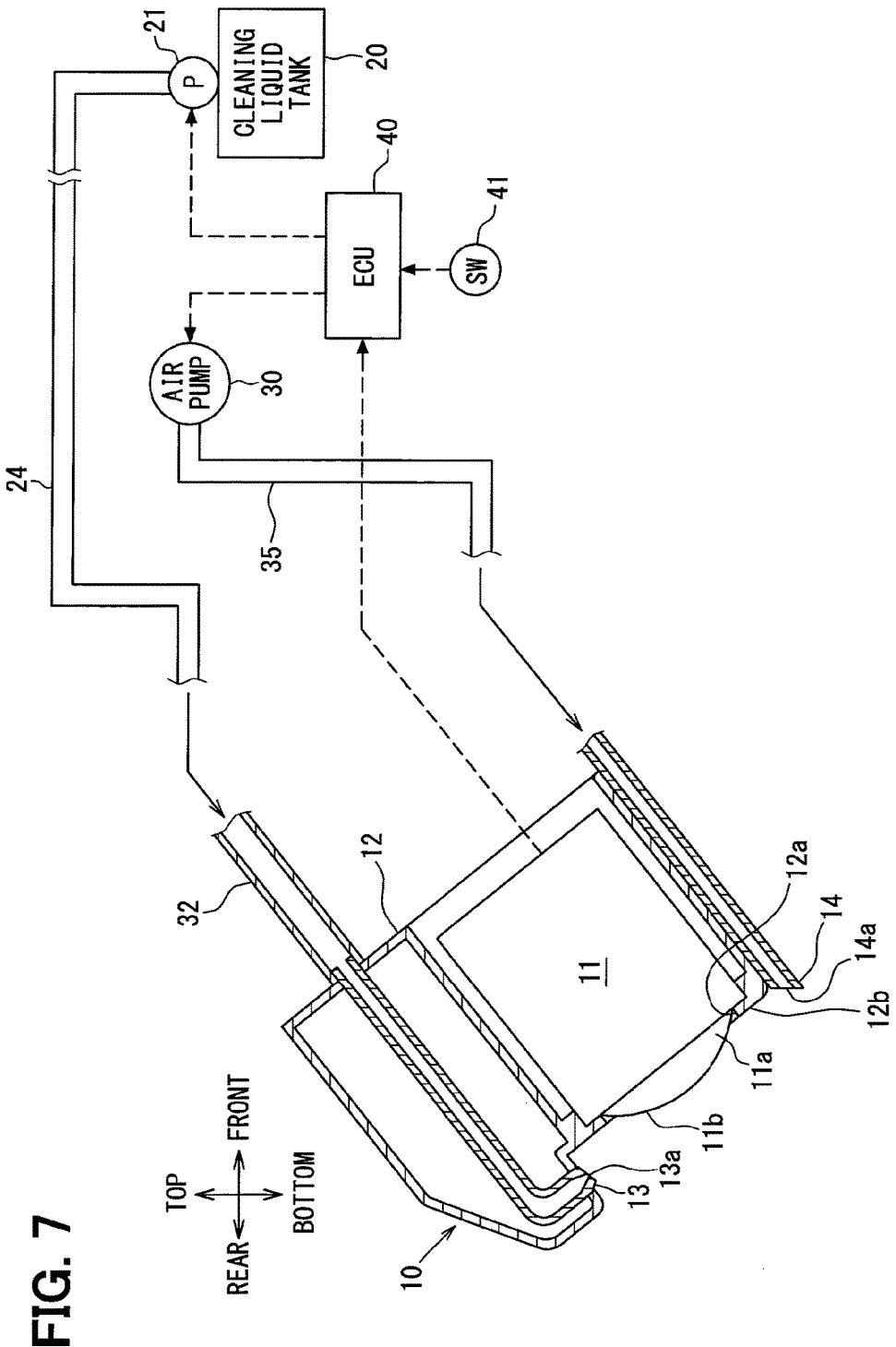
FIG. 7 is a diagram illustrating a cleaning apparatus for an in-vehicle optical sensor according to a second embodiment of the present disclosure.

In the first embodiment described above, the cleaning liquid nozzle 13 jets out the cleaning liquid together with the air. In contrast, as shown in FIG. 7, according to the present embodiment, the cleaning liquid nozzle 13 jets out only the cleaning liquid without jetting out the air.

Specifically, instead of the structure shown in FIG. 2 where the branch pipe 33 is connected to the air pipe 31 connected to the air pump 30, an air pipe 35 connected to the air pump 30 is connected to the air nozzle 14.

The same effects as obtained in the first embodiment can be obtained even in the present embodiment. However, since the force by which the cleaning liquid collides with the lens surface 11b is reduced, the amount of the cleaning liquid necessary to clean up the adhered matters. The structure of the first embodiment is advantageous at this point. However, the present embodiment is advantageous in that the air pipe structure can be simplified by removing the branch pipe 33.

In either the case where the cleaning liquid is jetted out together with the air or the case where only the cleaning liquid is jetted out, selecting the opening area and shape of the jet hole 13a and selecting the capacity of the air pump 30 can jet out the cleaning liquid in various ways as follows. For example, the cleaning liquid can be jetted on the lens surface 11b in the form of a spray, in the form of a grain not finer than the spray, or in the form of a mass of a constant amount.

Third Embodiment

Figure 8A:
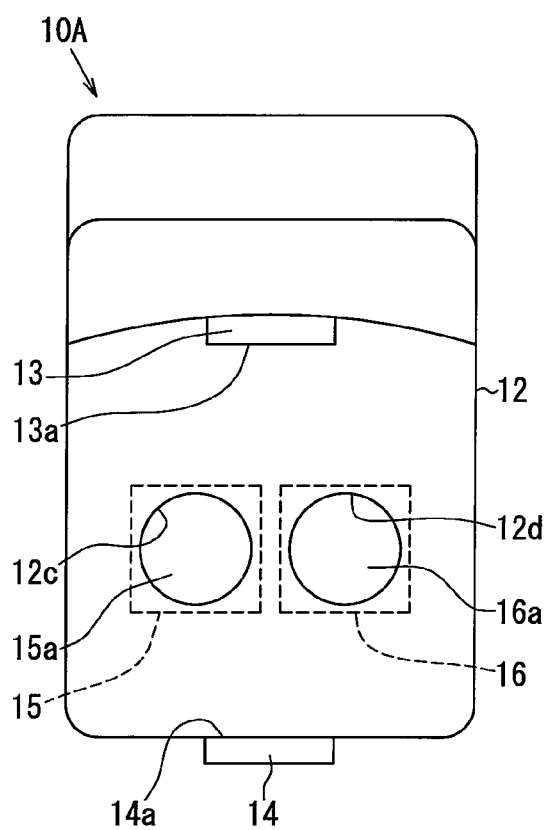
FIG. 8A is a diagram illustrating a cleaning apparatus for an in-vehicle optical sensor according to a third embodiment of the present disclosure and corresponds to FIG. 3A.
Figure 8B:
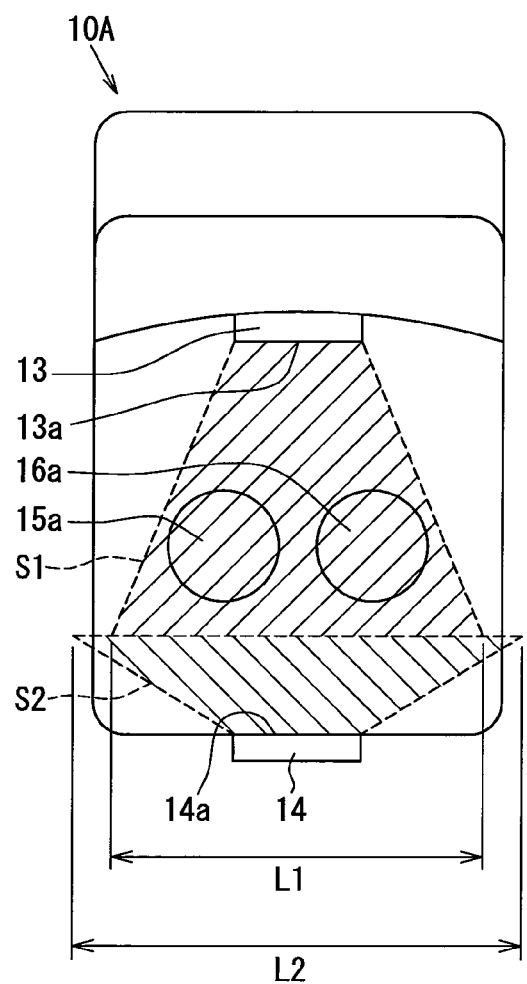
FIG. 8B is a diagram illustrating the cleaning apparatus for the in-vehicle optical sensor according to the third embodiment of the present disclosure and corresponds to FIG. 3B.

As shown in FIGS. 8A and 8B, in a camera unit 10A according to the present embodiment, an infrared light 15 (illuminating means) for radiating infrared rays is held in the housing 12 together with a camera 16. The jet pattern S1 of the cleaning liquid jetted out from the cleaning liquid nozzle 13 is set so that it can clean both a lens surface 15a of the infrared light 15 and a lens surface 16a of the camera 16.

For example, the infrared light 15 is used to supplement the surrounding brightness when the image is captured by the camera 16 at night. Thus, according to the present embodiment, extraneous matters adhered to the lens surface 15a of the infrared light 15 can be suitably removed so that the infrared rays can be radiated suitably. The infrared light 15 can be replaced with a visible-light light (illuminating means).

The air nozzle 14 described in the first embodiment is included in the present embodiment. Thus, like in the first embodiment, the vehicle V can be prevented from being soiled by the used cleaning liquid dripped from the lens surfaces 15a and 16a.

Fourth Embodiment

Figure 9:
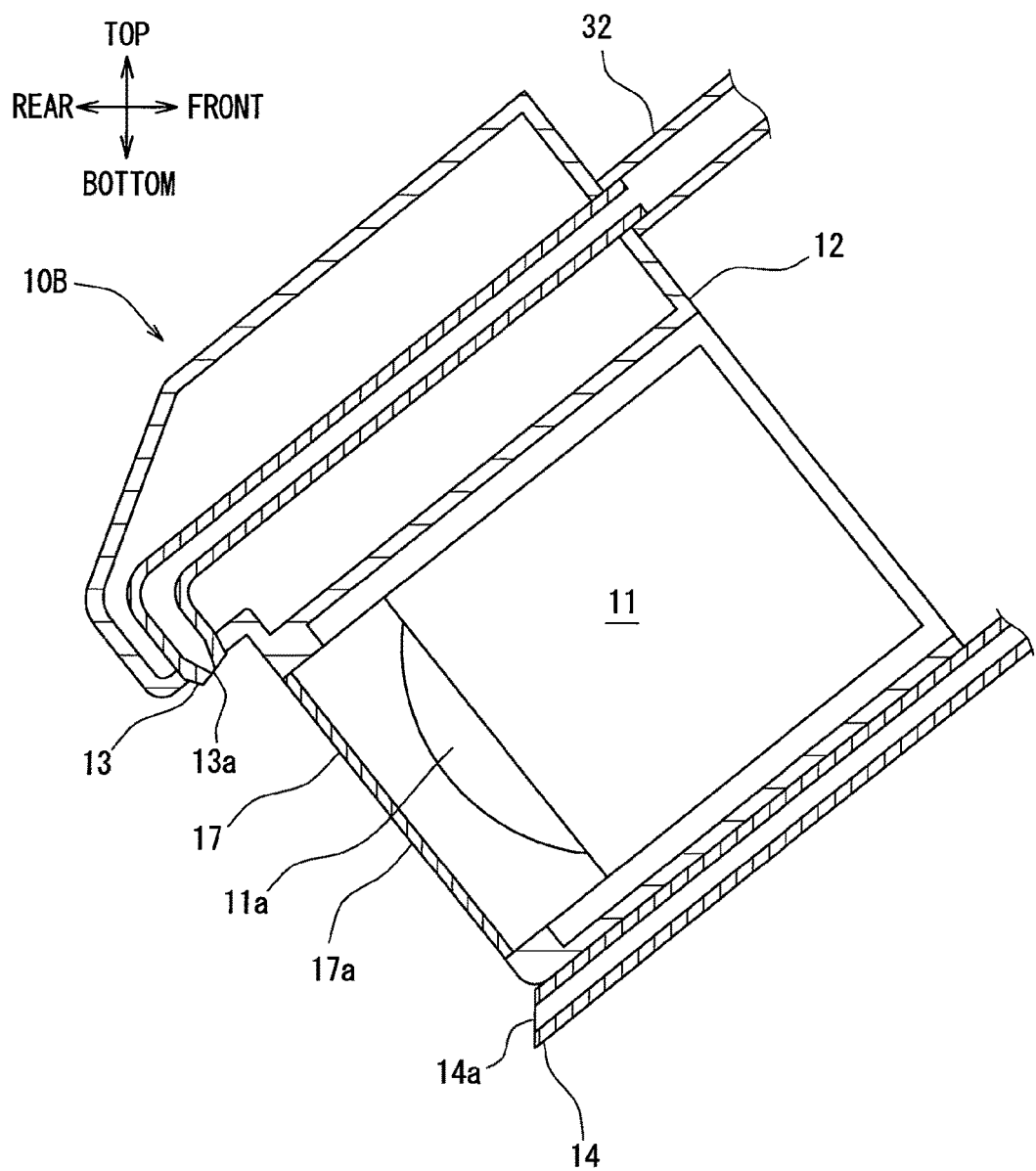
FIG. 9 is a diagram illustrating a cleaning apparatus for an in-vehicle optical sensor according to a fourth embodiment of the present disclosure.

In the camera unit 10 according to the first embodiment, the lens surface 11b is exposed from the opening 12a of the housing 12. In contrast, as shown in FIG. 9, in a camera unit 10B according to the fourth embodiment, the lens 11a is covered with a translucent cover 17 so that the lens surface 11b cannot be exposed. A translucent surface 17a which is a portion of the translucent cover 17 facing the lens 11a is cleaned by the cleaning liquid jetted out from the cleaning liquid nozzle 13.

The air nozzle 14 described in the first embodiment is included in the present embodiment. Thus, like in the first embodiment, the vehicle V can be prevented from being soiled by the used cleaning liquid dripped from the translucent surface 17a.

Fifth Embodiment

Figure 10:
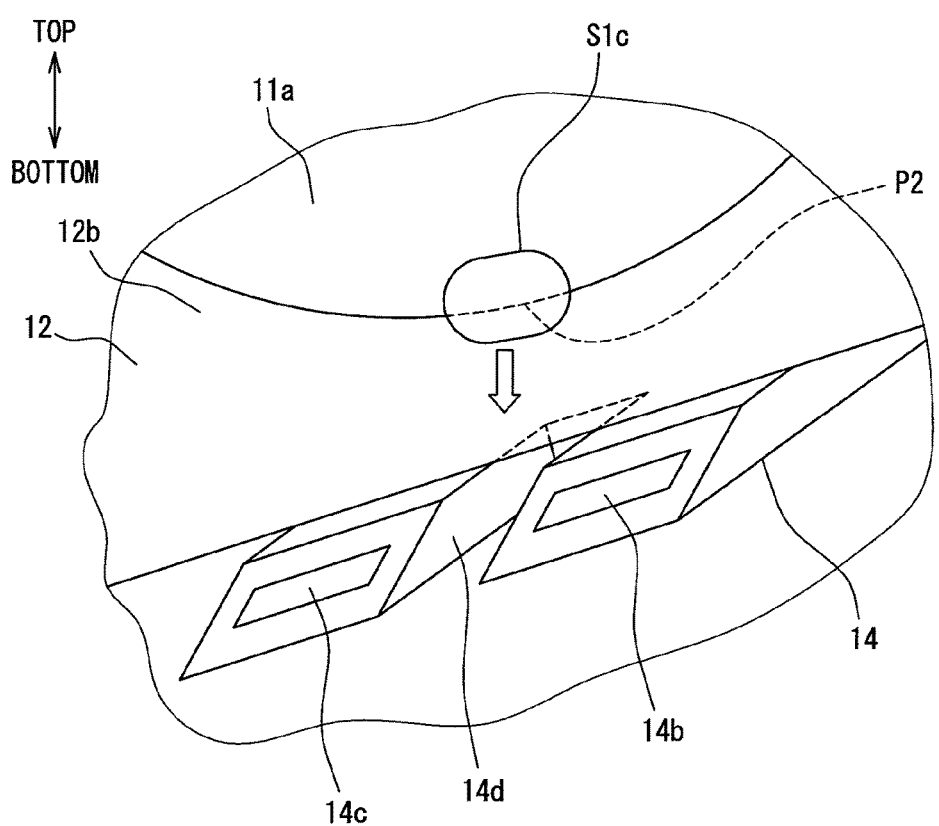
FIG. 10 is a diagram illustrating a cleaning apparatus for an in-vehicle optical sensor according to a fifth embodiment of the present disclosure.

FIG. 10 is a perspective enlarged view of jet holes 14b and 14c of an air nozzle 14 according to the present embodiment.

As shown in the drawing, a drain slot 14d is formed in a portion of the air nozzle 14 facing the lowermost end P2 of the lens 11a. Specifically, the jet holes 14b and 14c are divided in two in the left-right direction so that the drain slot 14d penetrating in the top-bottom direction can be formed between the jet holes 14b and 14c.

As mentioned previously, the liquid puddle S1c is likely to be formed at the lens holder 12b and at the lowermost end P2. If there is no drain slot 14d in contrast to the present embodiment, the liquid puddle S1c falls on the air nozzle 14, so that a liquid puddle may be formed on the air nozzle 14. Although this type of liquid puddle can be blown away by the jet of the air from the air nozzle 14, the air nozzle 14 does not always jet out the air. Therefore, when the liquid puddle S1c formed due to rainwater or dew condensation water adhered to the lens 11a falls on the air nozzle 14 or when rainwater is puddled on the air nozzle 14, it is preferable that the video should be prevented from being degraded by the liquid puddle on the air nozzle 14.

Based on this study, according to the present embodiment, the drain slot 14d is formed in the portion of the air nozzle 14 facing the lowermost end P2. Therefore, it is possible to prevent a liquid puddle from being formed in the portion of the air nozzle 14 nearest to the lens 11a, i.e., the portion facing the lowermost end P2. Thus, as mentioned above, the video can be prevented from being degraded by the liquid puddle on the air nozzle 14.

Sixth Embodiment

According to the present embodiment, as indicated by a dashed-dotted line in FIG. 2, an air switch 42 descried below is installed inside the interior of the vehicle. When the switch 41 is turned ON, the cleaning liquid nozzle 13 jets out both the cleaning liquid and the air. In contrast, when the air switch 42 is turned ON, the cleaning liquid nozzle 13 jets out only the air without jetting out the cleaning liquid. Specifically, the air pump 30 is actuated while the solenoid valve 23 is kept closed.

In some cases, the liquid puddle S1 formed at the lowermost end P2 of the lens 11a needs to be blown away despite the fact that the lens 11a is clean. In such a case, when the air switch 42 is turned ON, the liquid puddle S1 can be blown away without jetting out the cleaning liquid. The amount of usage of the cleaning liquid can be reduced accordingly.

(Modifications)

While the present disclosure has been described with reference to the embodiments, it is to be understood that the disclosure is not limited to the embodiments. The present disclosure is intended to cover various modifications and equivalent arrangements inside the spirit and scope of the present disclosure.

In the example indicated by the symbol S2a in FIG. 4, the jet of the air from the air nozzle 14 is not directly applied to the lens 11a. Alternatively, the jet of the air from the air nozzle 14 can be directly applied to a portion of the lens 11a.

In the example shown in FIG. 4, the center line C3 extends toward the position higher than the position toward which the reference line C2 extends. Alternatively, the center line C3 of the jet of the air can extend toward a position higher than a horizontal line (a line perpendicular to a direction of gravitational force), so that the cleaning liquid can be blown away as far as possible from the predetermined position Vb, Vc.

Alternatively, the center line C3 of the jet of the air can extend toward a position lower than the horizontal line. In such an approach, a distance by which the cleaning liquid is blown away is reduced, so that the cleaning liquid is less likely to fly over an object, such as a pedestrian, other than the vehicle V.

In the embodiments, the jet hole 14a of the air nozzle 14 is located below the lens 11a. Alternatively, the jet hole 14a can be located beside the lens 11a. However, it is preferable that the jet hole 14a should be located below the optical axis C1 of the lens 11a to ensure the certainty that the entire cleaning liquid can be blown away.

In the first embodiment, the cleaning liquid nozzle 13 jets out both the cleaning liquid and the air (cleaning air). Alternatively, a clearing air nozzle separate from the cleaning liquid nozzle 13 and the air nozzle 14 can be included, and cleaning air and the cleaning liquid can be jetted out from the separate nozzles by connecting the air pipe 31 shown in FIG. 2 to the clearing air nozzle. In this case, it is preferable that the cleaning air nozzle should be located facing the air nozzle 14. For example, when the air nozzle 14 is located below the lens 11a, it is preferable that the cleaning air nozzle should be located above the lens 11a.

In the embodiments, the in-vehicle optical sensor to be cleaned is mounted at the rear of the vehicle V. However, an optical sensor according to the present disclosure is not limited to this arrangement. For example, a camera which is mounted below a side mirror on the side of the vehicle V and configured to capture an area beside and behind the vehicle can be an optical camera to be cleaned.

The optical sensor is not limited to the camera 11, 16, but includes a device having a lens and capable of optically measuring a physical quantity. For example, the optical sensor can be another sensor such as a laser.

The invention claimed is:

1. A cleaning apparatus for an in-vehicle optical sensor comprising:
    a cleaning liquid nozzle configured to jet out a cleaning liquid toward a lens surface of a lens of the in-vehicle optical sensor or a translucent surface of a translucent cover covering the lens surface when the translucent cover exists, and
    an air nozzle, the air nozzle has a jet hole, the air nozzle is configured to jet out air from the jet hole toward a used cleaning liquid, which was jetted out from the cleaning liquid nozzle and cleaned the lens surface or the translucent surface, to prevent the used cleaning liquid from dropping from the lens surface or the translucent surface on a predetermined position by blowing away the used cleaning liquid,
    the jet hole of the air nozzle is in a shape and disposed at a position, wherein the shape of the jet hole and the position at which the jet hole is disposed are arranged to jet the air that is jetted from the jet hole of the air nozzle toward the used cleaning liquid so that the air is not directly jetted toward the lens surface.

2. The cleaning apparatus for the in-vehicle optical sensor according to claim 1, wherein
    the air nozzle is further arranged to prevent the air from being directly jetted on the translucent surface.

3. The cleaning apparatus for the in-vehicle optical sensor according to claim 1, wherein
    the jet hole of the air nozzle is located below a lowermost end of the lens surface or the translucent surface.

4. The cleaning apparatus for the in-vehicle optical sensor according to claim 3, wherein
    the air nozzle is arranged so that the air is jetted out from the jet hole toward a position higher than a reference line, and
    the reference line is parallel to an optical axis of the lens and passes through the jet hole.

5. The cleaning apparatus for the in-vehicle optical sensor according to claim 3, wherein
    the air nozzle has a drain slot located facing the lowermost end.

6. The cleaning apparatus for the in-vehicle optical sensor according to claim 1, wherein
    the cleaning liquid nozzle is capable of jetting out the cleaning liquid together with air pumped from an air pump, and
    the air nozzle is supplied with the air from the air pump.

7. The cleaning apparatus for the in-vehicle optical sensor according to claim 6, wherein
    the cleaning liquid nozzle and the air nozzle jet out the air for the same period of time.

8. The cleaning apparatus for the in-vehicle optical sensor according to claim 1, wherein
    the jet of the air from the air nozzle is ended after the jet of the cleaning liquid is ended.

9. The cleaning apparatus for the in-vehicle optical sensor according to claim 1, wherein
    the jet of the air from the air nozzle is started before the jet of the cleaning liquid is started.

10. The cleaning apparatus for the in-vehicle optical sensor according to claim 1, wherein
    the jet hole is in the shape and at the position, which are further arranged to blow away dripping cleaning liquid, which is formed on a lower side of the lens, toward behind the vehicle, without directly jetting air toward the lens surface.

11. The cleaning apparatus for the in-vehicle optical sensor according to claim 1, wherein
    the jet hole is in the shape and at the position, which are further arranged to directly jet air on a liquid puddle puddled on the lens surface, without directly jetting air toward the lens surface.

12. The cleaning apparatus for the in-vehicle optical sensor according to claim 1, wherein
    the cleaning liquid nozzle is further configured to jet cleaning liquid in a first jet pattern together with the air corresponding to a first diagonally shaded area of FIG. 3B, and
    the air nozzle is configured to jet air in a second jet pattern corresponding to a second diagonally shaded area of FIG. 3B,
    the first jet pattern has a first length (L1), the second jet pattern has a second length (L2), wherein the first length and the second length are at a position where the first jet pattern and the second jet pattern collide with each other, and
    the cleaning liquid nozzle and the air nozzle are in shapes and positions which are set to satisfy L2>L1.

13. The cleaning apparatus for the in-vehicle optical sensor according to claim 1, wherein
    the jet hole is in the shape and at the position, which are further arranged to directly jet air on a liquid puddle puddled at a lowermost end of the lens surface, without directly jetting air toward the lens surface.

* * * * *